Sept. 29, 1959   G. KLEMT ET AL   2,906,173
HIGH-SPEED TELEPHOTO OBJECTIVE
Filed July 26, 1957

INVENTORS:
Günter KLEMT
Heinrich MACHER
BY
Karl F. Ross
AGENT

United States Patent Office 2,906,173
Patented Sept. 29, 1959

2,906,173

HIGH-SPEED TELEPHOTO OBJECTIVE

Günter Klemt and Heinrich Macher, Kreuznach, Rhineland, Germany, assignors to Jos. Schneider & Co., Kreuznach, Rhineland, Germany, a company of Germany Application July 26, 1957, Serial No. 674,442

Claims priority, application Germany August 7, 1956

3 Claims. (Cl. 88—57)

Our present invention relates to telephoto objective systems of the type comprising a positively refracting lens group on the object side and a negatively refracting lens group on the image side of the system, the two lens groups being separated from each other by a relatively large air space.

Heretofore, difficulties have been experienced in adapting objective systems of this character for use with certain cameras, especially those of the so-called central-shutter type, while maintaining a large relative aperture. The general object of this invention is to provide a telephoto objective satisfying these desiderata.

A more specific object of our invention is to provide an objective system, of the character set forth, maintaining a good correction for all known types of aberration.

A feature of our invention resides in the provision of a telephoto objective of the construction set forth in which the two lens groups constitute the front and rear halves of a Gaussian dual objective having a front component in the form of a single lens, followed by a compound member cemented from two lenses of opposite refractivity, the rear half of the system consisting of two air-spaced single lenses, the relationships of the refractive powers and of the physical dimensions being such that the focal length of the front half ranges between 85% and 100% of the overall focal length of the system and that the back-focal distance of this front half is less than 65% of the overall focal length.

For the realization of the desired telephoto effect it is furthermore advantageous, according to another feature of the invention, that the air space between the positively refracting front half and the negatively refracting rear half be greater than 0.4 time the total axial length of the system (measured between the outer vertices of its front and rear lenses) but less than 40% of the overall focal length.

A further feature of the invention, designed to eliminate image curvature and astigmatism, resides in such a dimensioning of the cemented component of the front half that the ratio of the radii of curvature of its outer surfaces is less than 1.3, the difference between the refractive indices of the cemented lenses being at the same time greater than 0.15.

Figure 1:
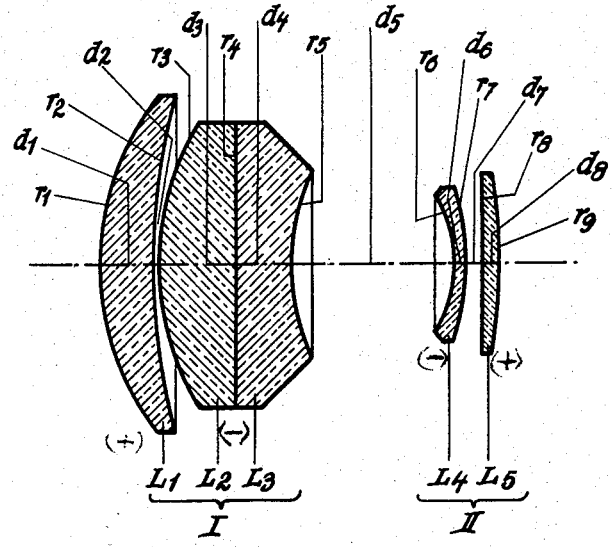
Figure 2:
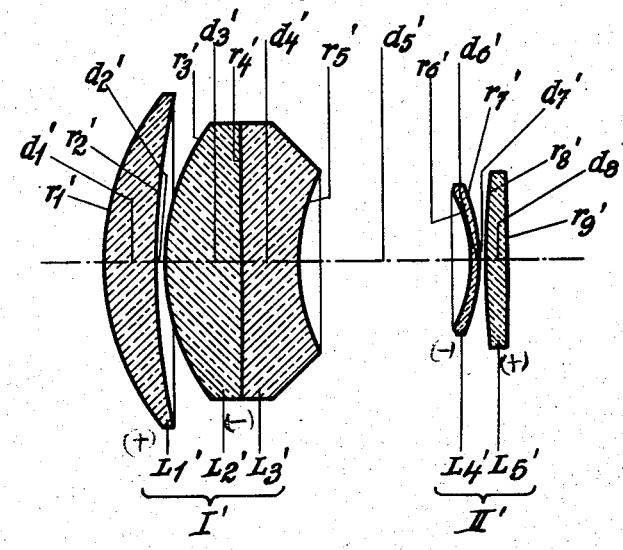

The invention will be described in greater detail with reference to the accompanying drawing in which Figs. 1 and 2 diagrammatically illustrate two different embodiments.

In Fig. 1 there has been shown a telephoto objective consisting of a front lens group I and a rear lens group II, the two groups consistuting the halves of a Gaussian dual objective. Front group or half I is composed of a positive meniscus $L_1$ followed by a positively refracting lens $L_2$ which is cemented onto a negatively refracting lens $L_3$ to form a compound meniscus. The rear group or half II, separated from front half I by a diaphragm space $d_5$, consists of a negative meniscus $L_4$ and a positive meniscus $L_5$, each being in the form of a single lens.

The following Table A lists representative numerical values, based upon an overall focal length $f$ of numerical value 100, for the radii $r_1$ to $r_9$ and the thicknesses and spacings $d_1$ to $d_8$ of lenses $L_1$ to $L_5$, along with their refractive indices $n_d$ and their Abbé numbers $\nu$, all relating to an objective system of aperture ratio 1:4.0 and back-focal distance $s=47.1$.

Table A

| | | | $n_d$ | $\nu$ |
|---|---|---|---|---|
| I | $L_1$ { $r_1=+25.99$ <br> $r_2=+68.52$ } | $d_1= 5.30$ | 1.5891 | 61.2 |
| | | $d_2= 0.58$ | Air space | |
| | $L_2$ { $r_3=+25.99$ <br> $r_4=-1122.44$ } | $d_3= 7.35$ | 1.4875 | 70.0 |
| | $L_3$ { $r_5=+20.73$ } | $d_4= 5.29$ | 1.6477 | 33.9 |
| | | $d_5=16.14$ | Diaphragm space | |
| II | $L_4$ { $r_6=-14.70$ <br> $r_7=-22.99$ } | $d_6= 1.06$ | 1.6134 | 57.3 |
| | | $d_7= 1.19$ | Air space | |
| | $L_5$ { $r_8=-281.02$ <br> $r_9=-49.11$ } | $d_8= 2.05$ | 1.7215 | 29.3 |
| | | $d_{\text{total}}=38.96$ | | |

In the system of Table A the focal length $f_1$ of front lens $L_1$ has the numerical value of 88.6, being thus between 85% and 100% of the overall focal length $f=100$, while the back-focal distance $s_I$ of the front group I amounts to 58.1, being thus less than 65% of focal length $f$. The ratio $r_3:r_5$ of the outer radii of the cemented member $L_2$—$L_3$ is less than 1.3 and the difference between the refractive indices $n_d$ of lenses $L_2$ and $L_3$ is 0.20.

In Fig. 2 a modified system according to the invention has been shown in which the lenses of the front group I' have been designated $L_1'$, $L_2'$ and $L_3'$ while the lenses of the rear group II' bear the designations $L_4'$ and $L_5'$. In the following Table B we have given representative numerical values, based again upon a numerical value of 100 for the overall focal length $f'$ of this system, for the radii $r_1'$ to $r_9'$ and for the thicknesses and spacings $d_1'$ to $d_8'$ of the objective shown in Fig. 2, along with the refractive indices $n_d$ and the Abbé numbers $\nu$ thereof, the system having an aperture ratio of 1:4.0 and a back-focal distance $s'=47.0$.

Table B

| | | | $n_d$ | $\nu$ |
|---|---|---|---|---|
| I' | $L_1'$ { $r_1'=+26.37$ <br> $r_2'=+84.42$ } | $d_1'= 5.28$ | 1.5182 | 65.2 |
| | | $d_2'= 0.58$ | Air space | |
| | $L_2'$ { $r_3'=+22.81$ <br> $r_4'=-1386.32$ } | $d_3'= 7.33$ | 1.4645 | 65.8 |
| | $L_3'$ { $r_5'=+19.17$ } | $d_4'= 5.65$ | 1.6645 | 35.9 |
| | | $d_5'=17.10$ | Diaphragm space | |
| II' | $L_4'$ { $r_6'=-14.09$ <br> $r_7'=-18.45$ } | $d_6'= 1.05$ | 1.6204 | 60.3 |
| | | $d_7'= 0.24$ | Air space | |
| | $L_5'$ { $r_8'=+84.09$ <br> $r_9'=-758.16$ } | $d_8'= 2.04$ | 1.7215 | 29.3 |
| | | $d_{\text{total}}=39.27$ | | |

The focal length $f_1'$ of the front lens $L_1'=98.6$, being thus again between 85% and 100% of the overall focal length. The back-focal distance $s_I'$ amounts to 64.0, hence is again less than 65% of the overall focal length. In this system, too, the ratio $r_3':r_5'$ of the outer radii of the cemented component $L_2'$—$L_3'$ is again less than 1.3 and the difference of the refractive indices of the cemented lenses is once more greater than 0.15, being 0.16 in the case of lenses $L_2'$ and $L_3'$.

We claim:

1. A telephoto objective system comprising a positively refracting front lens group and a negatively refracting rear lens group separated by a large air space, said lens groups constituting respective halves of a Gaussian dual objective, said front group consisting of a single meniscus-shaped positive front lens followed by a cemented negative meniscus composed of lenses of opposite refractivity, said rear group consisting of two air-spaced single lenses, said front group having a focal length ranging between 85% and 100% of the overall focal length of the system and having a back-focal distance less than 65% of said overall focal length, said objective system having an overall focal length of numerical value 100 and an aperture ratio of 1:4.0, the radii $r_1$—$r_9$, the thicknesses and spacings $d_1$—$d_8$, the refractive indices $n_d$ and the Abbé numbers $\nu$ of said front lens $L_1$, said lenses $L_2$—$L_3$ of said cemented meniscus, and said air-spaced single lenses $L_4$, $L_5$ having numerical values substantially as given in the following table:

| | | | | |
|---|---|---|---|---|
| $L_1$ | $+24.6 < r_1 < +27.6$ | $5.0 < d_1 < 5.6$ | $1.51 < n_d < 1.59$ | $61.0 < \nu < 65.4$ |
| | $+65.1 < r_2 < +88.6$ | $.55 < d_2 < .61$ | Air space | |
| $L_2$ | $+21.7 < r_3 < +27.3$ | $7.0 < d_3 < 7.7$ | $1.46 < n_d < 1.49$ | $65.6 < \nu < 70.2$ |
| $L_3$ | $-1456.0 < r_4 < -1178.0$ | $5.0 < d_4 < 5.9$ | $1.64 < n_d < 1.67$ | $33.8 < \nu < 36.0$ |
| | $+18.1 < r_5 < +21.7$ | $15.3 < d_5 < 18.0$ | Diaphragm space | |
| $L_4$ | $-15.5 < r_6 < -13.2$ | $1.0 < d_6 < 1.2$ | $1.61 < n_d < 1.63$ | $57.1 < \nu < 60.5$ |
| | $-24.1 < r_7 < -17.5$ | $.23 < d_7 < 1.3$ | Air space | |
| $L_5$ | $-295.0 < r_8 < +88.0$ | $1.9 < d_8 < 2.2$ | $1.72 < n_d < 1.73$ | $29.2 < \nu < 29.4$ |
| | $-798.0 < r_9 < -46.6$ | | | |

2. An objective system according to claim 1, having numerical values substantially as given in the following table:

| | | | | |
|---|---|---|---|---|
| $L_1$ | $r_1 = +25.99$ | $d_1 = 5.30$ | $n_d$ 1.5891 | $\nu$ 61.2 |
| | $r_2 = +68.52$ | $d_2 = 0.58$ | Air space | |
| $L_2$ | $r_3 = +25.99$ | $d_3 = 7.35$ | 1.4875 | 70.0 |
| $L_3$ | $r_4 = -1122.44$ | $d_4 = 5.29$ | 1.6477 | 33.9 |
| | $r_5 = +20.73$ | $d_5 = 16.14$ | Diaphragm space | |
| $L_4$ | $r_6 = -14.70$ | $d_6 = 1.06$ | 1.6134 | 57.3 |
| | $r_7 = -22.99$ | $d_7 = 1.19$ | Air space | |
| $L_5$ | $r_8 = -281.02$ | $d_8 = 2.05$ | 1.7215 | 29.3 |
| | $r_9 = -49.11$ | | | |

3. An objective system according to claim 1, having numerical values substantially as given in the following table:

| | | | | |
|---|---|---|---|---|
| $L_1'$ | $r_1' = +26.37$ | $d_1' = 5.28$ | $n_d$ 1.5182 | $\nu$ 65.2 |
| | $r_2' = +84.42$ | $d_2' = 0.58$ | Air space | |
| $L_2'$ | $r_3' = +22.81$ | $d_3' = 7.33$ | 1.4645 | 65.8 |
| $L_3'$ | $r_4' = -1386.32$ | $d_4' = 5.65$ | 1.6645 | 35.9 |
| | $r_5' = +19.17$ | $d_5' = 17.10$ | Diaphragm space | |
| $L_4'$ | $r_6' = -14.09$ | $d_6' = 1.05$ | 1.6204 | 60.3 |
| | $r_7' = -18.45$ | $d_7' = 0.24$ | Air space | |
| $L_5'$ | $r_8' = +84.09$ | $d_8' = 2.04$ | 1.7215 | 29.3 |
| | $r_9' = -758.16$ | | | |

References Cited in the file of this patent

UNITED STATES PATENTS

| | | |
|---|---|---|
| 1,791,276 | Konig | Feb. 3, 1931 |
| 2,169,130 | Tronnier et al. | Aug. 8, 1939 |
| 2,321,973 | Bennett | June 15, 1943 |
| 2,631,497 | Schlegel | Mar. 17, 1953 |
| 2,660,093 | Bertele | Nov. 24, 1953 |
| 2,660,095 | Cook | Nov. 24, 1953 |

FOREIGN PATENTS

| | | |
|---|---|---|
| 363,499 | France | May 7, 1906 |
| 487,271 | Germany | Dec. 11, 1929 |